United States Patent [19]
Kimura et al.

[11] Patent Number: 6,104,006
[45] Date of Patent: Aug. 15, 2000

[54] METHOD AND APPARATUS FOR THE PROGRAMMED TEMPERATURE CONTROL OF A HEATING BARREL

[75] Inventors: Shigeru Kimura; Takeo Imura, both of Aichi, Japan

[73] Assignee: Kabushiki Kaisha Meiki Seisakusho, Aichi-ken, Japan

[21] Appl. No.: 08/831,471

[22] Filed: Mar. 31, 1997

[30] Foreign Application Priority Data

Jul. 17, 1996 [JP] Japan .................................. 8-207851

[51] Int. Cl.⁷ .......................... H05B 3/42; B29C 45/78; B29C 45/74
[52] U.S. Cl. ..................... 219/422; 219/425; 425/549; 222/146.5
[58] Field of Search ................... 219/422, 424, 219/425, 427; 425/549, 564; 222/146.5

[56] References Cited

U.S. PATENT DOCUMENTS

| | | | |
|---|---|---|---|
| 4,548,341 | 10/1985 | Hambleton | 222/146.5 |
| 4,649,262 | 3/1987 | Yoshikawa | 219/424 |
| 4,678,420 | 7/1987 | Inoue | 425/549 |
| 5,261,807 | 11/1993 | Hehl | 425/564 |
| 5,776,513 | 7/1998 | Honjo et al. | 425/549 |

FOREIGN PATENT DOCUMENTS

| | | |
|---|---|---|
| 5-228973 | of 0000 | Japan . |
| 63-37228 | 10/1988 | Japan . |
| 55651 | 1/1993 | Japan . |
| 525661 | 4/1993 | Japan . |
| 7267 | 1/1995 | Japan . |
| 7-110511 | 11/1995 | Japan . |

*Primary Examiner*—Teresa Walberg
*Assistant Examiner*—J. Pelham
*Attorney, Agent, or Firm*—Browdy and Neimark

[57] ABSTRACT

A method and an apparatus for the programmed temperature control of a heating barrel provides for programmed temperature control in which a thermal sensor can be set selectively in either or any of plural sensor holes on the feeding zone of the heating barrel. By sensing the temperature at the most appropriate position with in the feeding zone, the molding injection is adapted to various resins with different properties, preventing clogging of resin in the heating barrel and changed color of molded articles.

9 Claims, 4 Drawing Sheets

METHOD AND APPARATUS FOR THE PROGRAMMED TEMPERATURE CONTROL OF A HEATING BARREL

FIELD OF THE INVENTION

The present invention relates generally to a method and an apparatus for the programmed temperature control of a heating barrel in an injection molding machine.

DESCRIPTION OF RELATED TECHNOLOGY

Many prior publications relate to the programmed temperature control of the heating barrel in an injection molding machine. The disclosures of Toku Kou Hei 5-5651 ("A method for detecting temperature in an injection molding machine"), 5-25661 ("A heating apparatus of an injection molding machine"), 7-110511 ("A method and an apparatus for the temperature control of the heating barrel of an injection molding machine"), Jitsu Kou Hei 7-267 ("An apparatus for the temperature control of a barrel") and Jitsu Kou Shou 63-37228 ("A heating apparatus of a heating barrel") refer to the temperature control of the heating barrel in an injection molding machine.

FIG. 3 illustrates graphically the real temperature of a heating barrel as a function of position along the heating barrel for injection molding of polyamide resin and shows a section of a heating barrel apparatus.

A heating barrel 10 terminates in an injection nozzle 19 at the forward end and mounts to a hopper for reserve resin (not shown) at its rear portion. It has three zones: feeding zone 11, compression zone 12, and metering zone 13 which correspond to the respective feeding zone, compression zone and metering zone of the screw 9, which is capable of reciprocating and rotating in the heating barrel 10. The heating barrel 10 mounts plural heaters 20 on its outer periphery.

Sensor holes 30, 40 and 50 for respective thermal sensors 35, 45, and 55 are located at the three zones 11, 12, and 13 respectively. Each thermal sensor 35, 45, and 55 can be set to respectively sense the temperature of each zone on the barrel 10, and the temperature of each zone is controlled in accordance with a preset temperature T1, T2, and T3 at each zone.

The legend C in FIG. 3 shows the real temperature of the heating barrel as a function of the position on the barrel 10 for injection molding of polyamide resin. In the exemplary molding operation of FIG. 3 the preset temperatures T1, T2, T3 were 250° C. at the feed zone 11, 260° C. at the compression zone 12, and 270° C. at the metering zone 13. The rotation speed of the screw 9 was set at 200 rpm.

To further shorten the molding cycle of polyamide resin, the rotation speed of the screw 9 was increased to 350 rpm at the above temperature conditions of the heating barrel 10, but the increased rotation speed made continuous molding impossible.

This is supposed to result from the resin not being melted sufficiently due to a deficient quantity of heat. Polyamide resin, with larger specific heat at the feeding zone, is rapidly fed into the compression zone 12 to be compressed therein, causing clogging and sticking of the resin.

To solve the above problem, a programmed temperature control shown in FIG. 4 was tried under the following preset temperatures of the heating barrel 10: 250° C. at the feed zone 11, 280° C. at the compression zone 12, and 270° C. at the metering zone 13 respectively, with the rotation speed of the screw 9 set at 350 rpm.

This temperature control program enabled polyamide resin to mold continuously without clogging of resin in the feed zone 11 or the compression zone 12. However, the color of the molded articles changed to yellowish.

As understood from the legend D depicted in FIG. 4, the temperature of the heating barrel 10 in molding polyamide resin was increased in the compression zone 12. Excessive heat resulted in changing the colors of the molded articles.

The programmed temperature control for molding polyamide resin was tried under various other conditions without changing the position at which the thermal sensors 35, 45, and 55 were located on the heating barrel 10 (i.e. as shown in the FIG. 3 and 4) but these trials also resulted in failure.

SUMMARY OF THE INVENTION

In light of the above-mentioned problem, it is an object of the present invention to provide a novel method and apparatus for molding resin having a larger specific heat at a higher rotation speed of the screw.

Another object of the invention is to provide a novel method and apparatus in which a resin with large specific heat is molded at a higher screw rotation speed without the resin clogging at the feed zone or in the compression zone of the heating barrel.

A further object of the present invention is to provide a novel method and apparatus in which the temperature of the heating barrel is controlled not only with the customary temperature program control but also by selecting appropriate positions of the thermal sensors on the heating barrel.

A still further object of the present invention is to provide a novel method and apparatus in which the position for setting the thermal sensor at the feeding zone on the heating barrel can be selected to appropriately mold various resins in accordance with their respective properties.

BRIEF DESCRIPTION OF THE DRAWING

The above and other objects and the nature and advantages of the present invention will become more apparent from the following detailed description of embodiments taken in conjunction with drawings, wherein.

DETAILED DESCRIPTION OF THE PREFERRED EMBODIMENT

This invention will described in further detail by way of an example with reference to the accompanying drawings.

Figure 1:
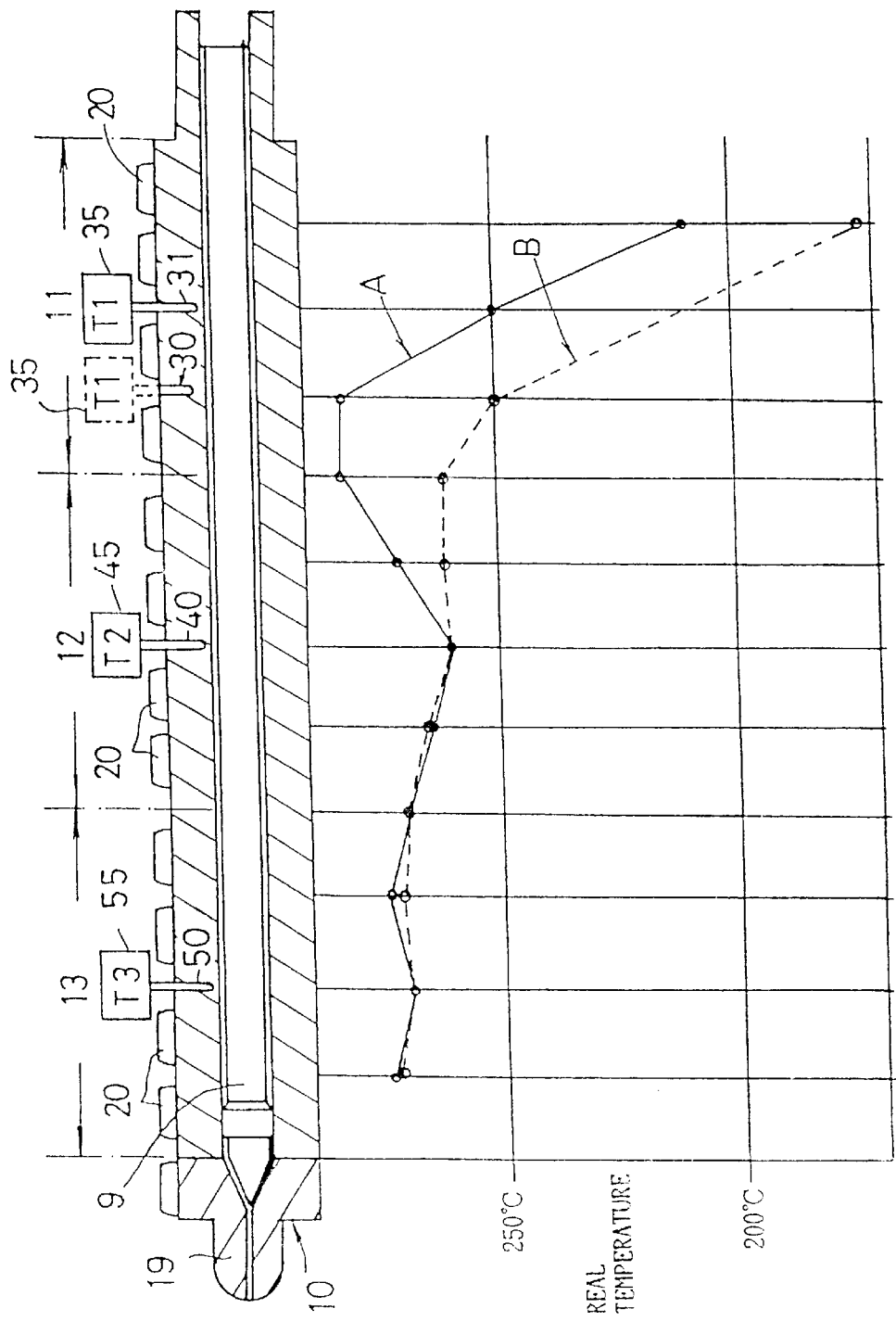
FIG. 1 is a combined sectional elevation and graphical view of a heating barrel including a screw, showing the real temperature of the heating barrel as a function of position along the heating barrel 10 under programmed temperature control of the present invention.

In FIG. 1, a heating barrel 10 terminates in an injection nozzle 19 at a forward end, and mounts to a hopper holding reserve resin (not shown) at the rear portion. The barrel 10 has three zones: a feeding zone 11, a compression zone 12, and a metering zone 13. These three zones correspond respectively to the feeding, compression, and metering zones of an injecting screw 9. The screw 9 includes means for reciprocating and rotating in the heating barrel 10.

The heating barrel 10 is provided on its outer periphery with heater 20 and mounting sensor holes 30, 40, and 50 (for thermal sensors 35, 45, and 55) located respectively in the three zones (the feeding zone 11, compression zone 12, and metering zone 13). Each thermal sensor 35, 45, and 55 senses the temperature of a respective zone on the barrel 10. The sensed temperatures are compared to preset temperatures T1, T2, and T3 respectively, whereby the programmed temperature control of the heating barrel 10 is executed.

In the present invention, the heating barrel 10 is provided with two sensor holes 30 and 31 in the feeding zone 11, into either of which the thermal sensor 35 can be set alternatively so that an appropriately selected position for sensing of temperature in the feeding zone 11 serves to adapt the temperature control of the heating barrel for various resins with respective different specific heat and properties.

Specifically, Polyamide resin is molded by selecting the sensor hole 31 under conditions that preset temperature, T1, T2, and T3 of the heating barrel 10 are set at 250° C., 260° C., and 270° C. respectively, and screw rotation speed is set at 350 rpm.

A solid line A in the graph of FIG. 1 shows real temperature on the heating barrel 10 according to the present invention. The solid line A shows that the temperature rises in the feeding zone 11. Thus temperature rises in the early stage. The feeding zone 11 serves to preheat polyamide resin (which has a large specific heat) without raising the temperature between the compression zone 12 and the metering zone 13. This in prevents clogging of the resin therein and moreover prevents the yellowish color of the molded articles.

In the case of customary resin molding for which temperature is not required to be raised so much at an early stage in the feeding zone 11 (e.g., in case of molding at customary injection rates), the resin is molded by selecting the sensor hole 30. A broken line B in the graph of FIG. 1 shows real temperature on the heating barrel 10 in the case of customary molding. In this case the polyamide resin was molded with the preset temperatures T1, T2, and T3 of the heating barrel 10 were set at 250° C., and 260° C., and 270° C. respectively and screw rotation speed was set at 200 rpm.

Figure 2:
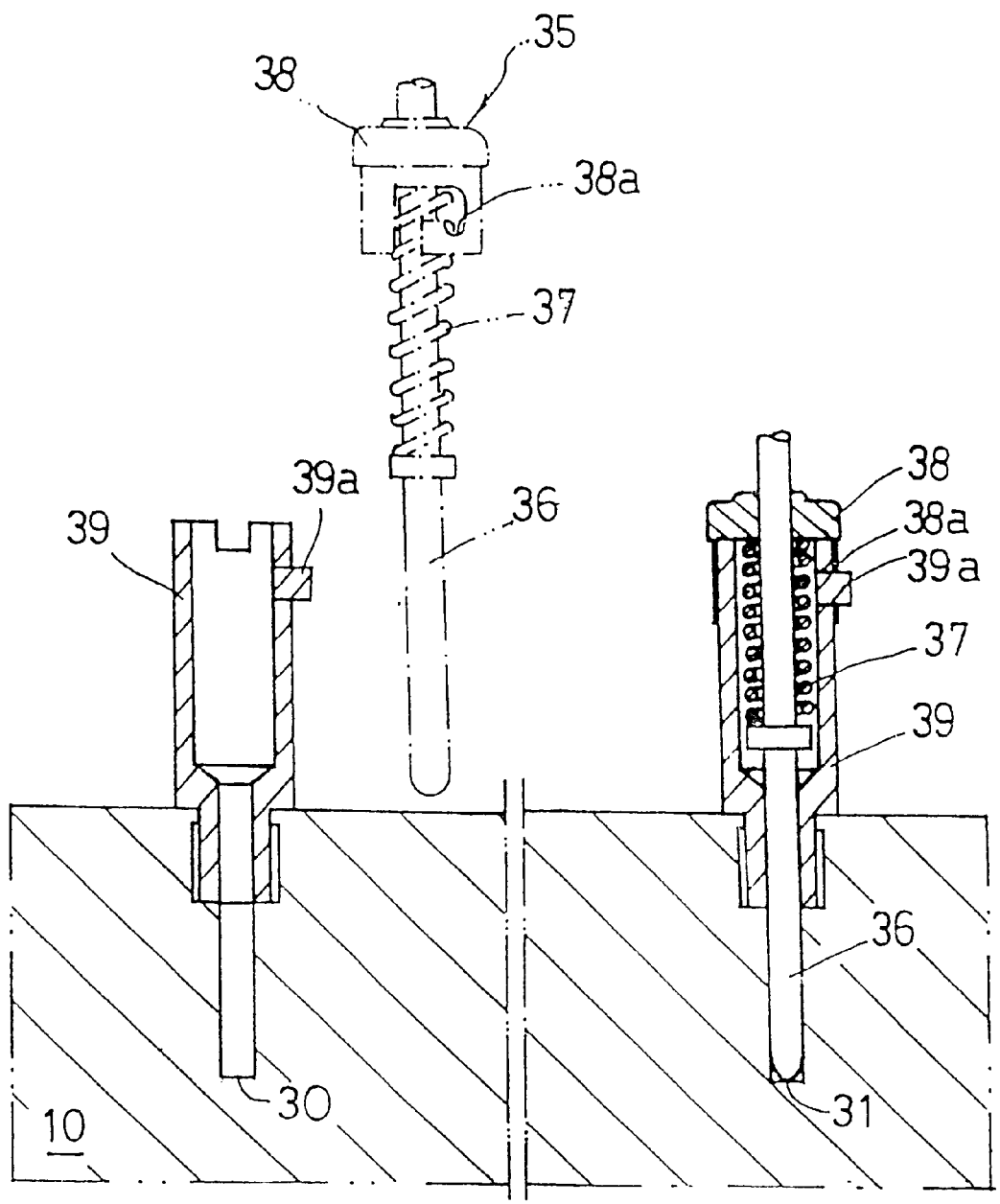
FIG. 2 is a sectional fragmentary elevation view of a thermal sensor fitted on the heating barrel and (in phantom view) removed from it.
Figure 3:
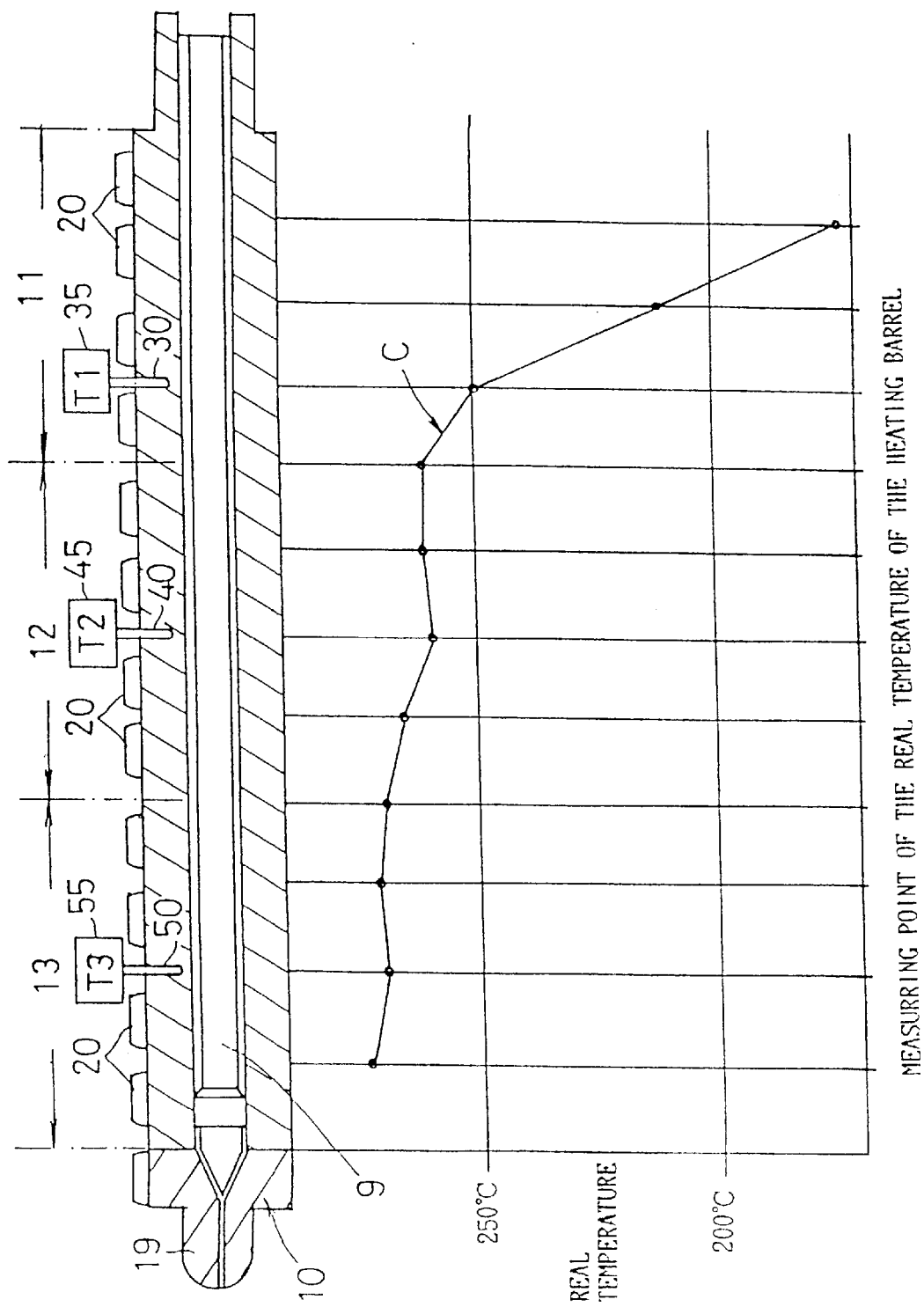
FIG. 3 is a combined sectional elevation and graphical view of a heating barrel including a screw, showing the real temperature of the heating barrel 10 as a function of position on the programmed temperature control of the heating barrel 10 at 200 rpm of screw rotation speed for polyamide resin.
Figure 4:
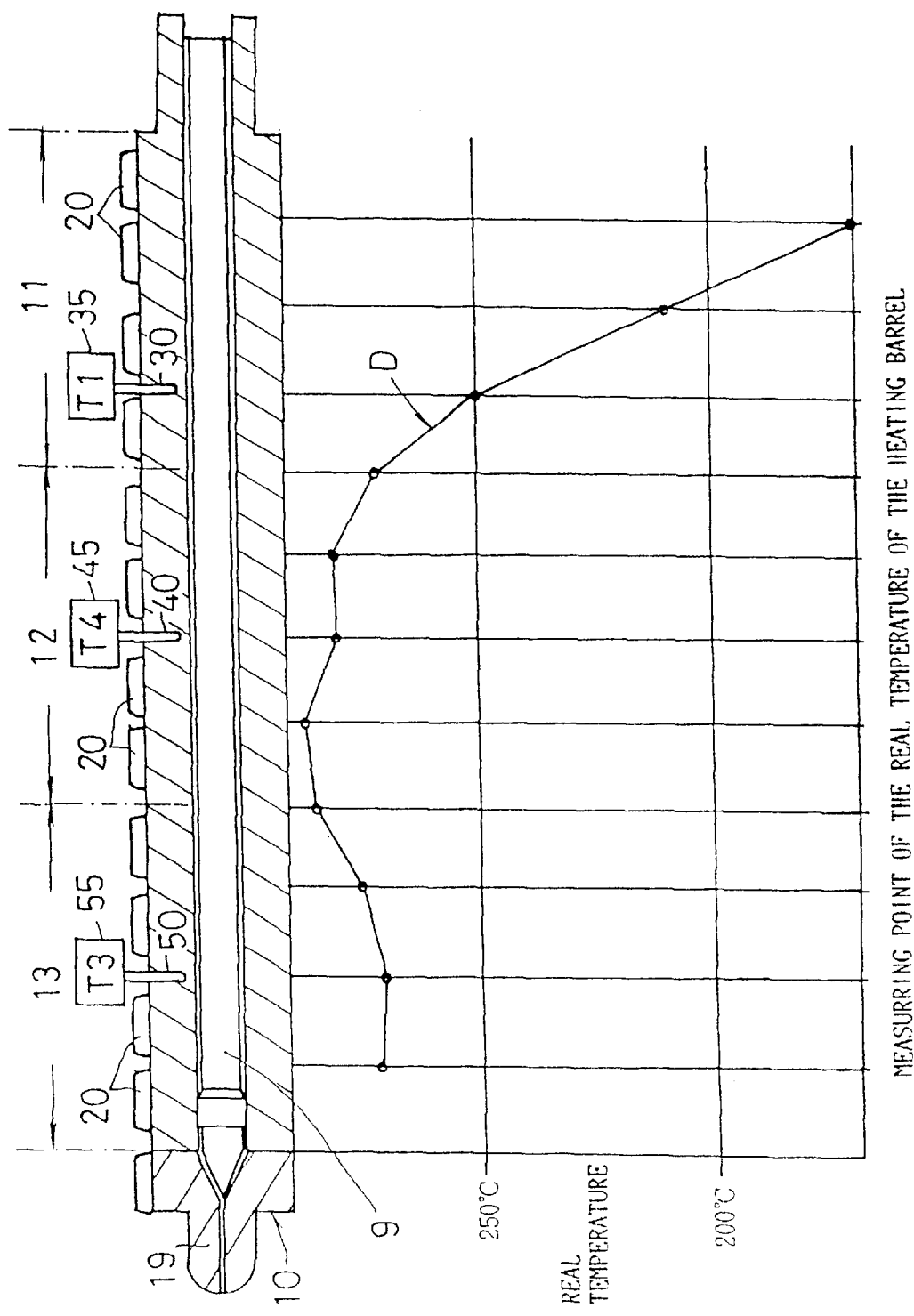
FIG. 4 is a sectional elevation and graphical view of a heating barrel including a screw, showing the real temperature of the heating barrel as a function of position along the heating barrel 10 with programmed temperature control of the heating barrel 10, screw rotation at 350 rpm, and polyamide resin.

The operation for changing the position of the thermal sensor 35 will be understood from FIG. 2.

A sensor holder 39 is screwed down in the thread portions of the sensor holes 30 and 31 respectively. The thermal sensor 35 (a thermocouple is used in the present invention) is provided with a cup 38 (capable of turning and sliding along the thermal sensor 35) and a coil spring 37.

The thermocouple elongate portion 36 is inserted into either of the thermosensor holes 30 or 31 through the sensor holder 39. Then the cap is pushed down and turned against the resilience of the coil spring 37 to engage a notch 38a (provided on the cap 38) to a pin 39a fixed on the outer periphery of the sensor holder 39, enabling the thermocouple to be set in either sensor hole 30 or 31. Reverse operation of the setting operation enables the thermocouple to be removed from the sensor hole 30 or 31.

Through the above described embodiment refers to two sensor holes at the feeding zone 11, the present invention is not restricted to two sensor holes.

As mentioned above, the present invention includes a novel method and apparatus in which selecting the position of the thermal sensor 35 in the feeding zone 11 can control appropriately the temperature in the feeding zone to preheat the resin in the heating barrel, thus doing away with clogging and color changing. In addition to using an ordinary programmed temperature control along with setting or removing the thermal sensor 35, the present invention can be carried out simply by electronic manipulation so as to save the operational time for changing positions of the thermosensor 35. be left in place and a choice of sensor for programming can be made electronically; in a second alternative, the position for sensing temperature in the feeding zone 11 can be implemented by setting or removing the thermal sensor 35, so that no modification or addition of electric parts is required in the electric circuit and no program changes are needed for the programmed temperature control. This avoids complicated electric circuits.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In a plastic-injection heating barrel of the type having:
   a forward end including a nozzle;
   a rear portion including a hopper mounting;
   an injecting screw housed in the barrel;
   an outer periphery comprising zones along a length of the barrel, the zones including a feeding zone adjacent the rear portion, an intermediate compression zone, and a metering zone adjacent the forward end;
   a respective thermal heater for each zone;
   a plurality of sensor mountings disposed along the length of the barrel, for thermally coupling the barrel to a thermal sensor; and
   a controller coupling the barrel to an electrical heating means for maintaining a predetermined temperature profile along the barrel, the profile being a function of thermal sensor signals;
   the improvement comprising:
   one of the zones including more than one sensor mounting;
   whereby the barrel is adaptable to different molding conditions.

2. The improvement according to claim 1, wherein the one of the zones is the feeding zone.

3. The improvement according to claim 1, wherein the different molding conditions include a slower injection screw rotation rate and a faster injection screw rotation rate.

4. The improvement according to claim 1, wherein the different molding conditions include different resins.

5. The improvement according to claim 1, wherein the sensor mountings include holes in the barrel and the thermal sensor includes an elongate portion insertable therein.

6. The improvement according to claim 1, wherein the control means is selectively responsive to alternative thermal sensor signals from the one of the zones.

7. The improvement according to claim 4, wherein the different resins include different specific heats.

8. A method of controlling a temperature profile of a plastic-injection heating barrel, including the steps of:
   (a) providing a heating barrel including:
      a forward end including a nozzle;
      a rear portion including a hopper mounting;
      an injecting screw housed in the barrel;
      an outer periphery comprising zones along a length of the barrel, the zones including a feeding zone adjacent the rear portion, an intermediate compression zone, and a metering zone adjacent the forward end;
      a respective thermal heater for each zone;
      a plurality of sensor mountings disposed along the length of the barrel, for thermally coupling the barrel to a thermal sensor;
      wherein one of the zones including a first sensor mounting and a second sensor mounting; and
      a controller coupling the barrel to an electrical heating means for maintaining a predetermined temperature profile along the barrel, the profile being a function of thermal sensor signals; and
   (b) mounting the sensor in just one of the first sensor mounting and a second sensor mounting;
   whereby the barrel is adaptable to molding resins having respectively different heat properties.

9. The method according to claim 8, comprising a step of the controller responding selectively to alternative thermal sensor signals from the one of the zones.

* * * * *